United States Patent
Prest et al.

(10) Patent No.: US 10,424,041 B2
(45) Date of Patent: Sep. 24, 2019

(54) THREAD INDEPENDENT SCALABLE VECTOR GRAPHICS OPERATIONS

(71) Applicant: Microsoft Technology Licensing, LLC, Redmond, WA (US)

(72) Inventors: Ian J. Prest, Bellevue, WA (US); Rossen Atanassov, Seattle, WA (US); Kevin M. Babbitt, Seattle, WA (US); Bogdan Brinza, Seattle, WA (US); Samuel R. Fortiner, Bothell, WA (US); Richard K. James, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/838,040

(22) Filed: Dec. 11, 2017

(65) Prior Publication Data

US 2019/0180405 A1 Jun. 13, 2019

(51) Int. Cl.
*G06T 1/20* (2006.01)
*G06F 3/0484* (2013.01)

(52) U.S. Cl.
CPC ............ *G06T 1/20* (2013.01); *G06F 3/04847* (2013.01)

(58) Field of Classification Search
None
See application file for complete search history.

(56) References Cited

U.S. PATENT DOCUMENTS

| | | | |
|---|---|---|---|
| 5,978,838 A | 11/1999 | Mohamed et al. | |
| 6,115,051 A | 9/2000 | Simons et al. | |
| 6,920,635 B1* | 7/2005 | Lodrige | G06F 9/546 719/314 |
| 6,950,927 B1* | 9/2005 | Apisdorf | G06F 9/3838 712/216 |
| 8,081,184 B1* | 12/2011 | Nordquist | G06T 15/005 345/426 |
| 8,108,625 B1* | 1/2012 | Coon | G06F 13/1663 711/127 |
| 8,164,596 B1 | 4/2012 | Bech | |

(Continued)

OTHER PUBLICATIONS

Atanassov, et al., "CSS Positioned Layout Module Level 3", Retrieved from: https://drafts.csswg.org/css-position-3/#position-property, Nov. 8, 2017, 83 Pages.

(Continued)

*Primary Examiner* — Jason A Pringle-Parker
(74) *Attorney, Agent, or Firm* — Fountainhead Law Group P.C.

(57) ABSTRACT

A first thread sends a rendering request for a scalable video graphics operation using a scalable video graphics object to a second thread. The second thread processes the scalable video graphics operation to render the scalable video graphics object using a first set of parameters that is stored in a data structure. The first thread performs a computation that calculates a second set of parameters for the scalable video graphics operation and stores the second set of parameters in the data structure. The first thread sends a signal to the second thread indicating that the first set of parameters have changed to the second set of parameters to allow the second thread to synchronize and use the second set of parameters to process the scalable video graphics operation.

19 Claims, 7 Drawing Sheets

(56) References Cited

U.S. PATENT DOCUMENTS

| | | | |
|---|---|---|---|
| 2006/0150194 A1* | 7/2006 | Xing | G06F 9/461 |
| | | | 718/108 |
| 2006/0244754 A1* | 11/2006 | Beda | G06T 15/005 |
| | | | 345/557 |
| 2008/0117220 A1* | 5/2008 | Gorchetchnikov | G06F 9/5027 |
| | | | 345/503 |
| 2009/0267950 A1 | 10/2009 | Finn et al. | |
| 2011/0285747 A1* | 11/2011 | Kilgard | G06T 11/203 |
| | | | 345/613 |
| 2014/0282423 A1* | 9/2014 | Gottschlich | G06F 9/52 |
| | | | 717/127 |
| 2016/0170813 A1* | 6/2016 | Robison | G06F 9/522 |
| | | | 718/106 |
| 2016/0357703 A1* | 12/2016 | Suzuki | G06F 15/17318 |

OTHER PUBLICATIONS

"Non Final Office Action Issued in U.S. Appl. No. 15/824,548", dated Apr. 19, 2019, 20 Pages.

* cited by examiner

THREAD INDEPENDENT SCALABLE VECTOR GRAPHICS OPERATIONS

BACKGROUND

Scalable vector graphics (SVG) is a vector image format for two-dimensional graphics that supports interactivity and animation. Extensible markup language (XML) text files define the behavior of objects in the scalable vector graphics images. Unlike a raster image, which is composed of a fixed set of pixels, a vector image is composed of a fixed set of shapes. The objects are rendered based on the SVG definition in the text files.

A user interface thread may interact with a rendering thread to render the SVG objects. The user interface thread may receive an event from a script for an SVG object and calculate parameters for rendering the SVG object, such as the positioning, color, layout, and other characteristics. The user interface thread then passes the parameters for the SVG object to the rendering thread, which can render the SVG object along with any other SVG objects in the user interface. While the rendering thread is rendering the SVG object, the user interface thread is blocked from performing any other computations. When the rendering thread finishes rendering the SVG object, the user interface thread can begin performing any computations. By blocking the user interface thread, the user interface thread may miss some events from the script that need to be processed. Further, the amount of time the user interface thread is active is reduced by the amount of time the rendering thread takes to render the SVG objects. This is an inefficient use of the user interface thread. For example, the time the user interface thread has to perform computations may be reduced by half or more due to the blocking.

DETAILED DESCRIPTION

Figure 1:
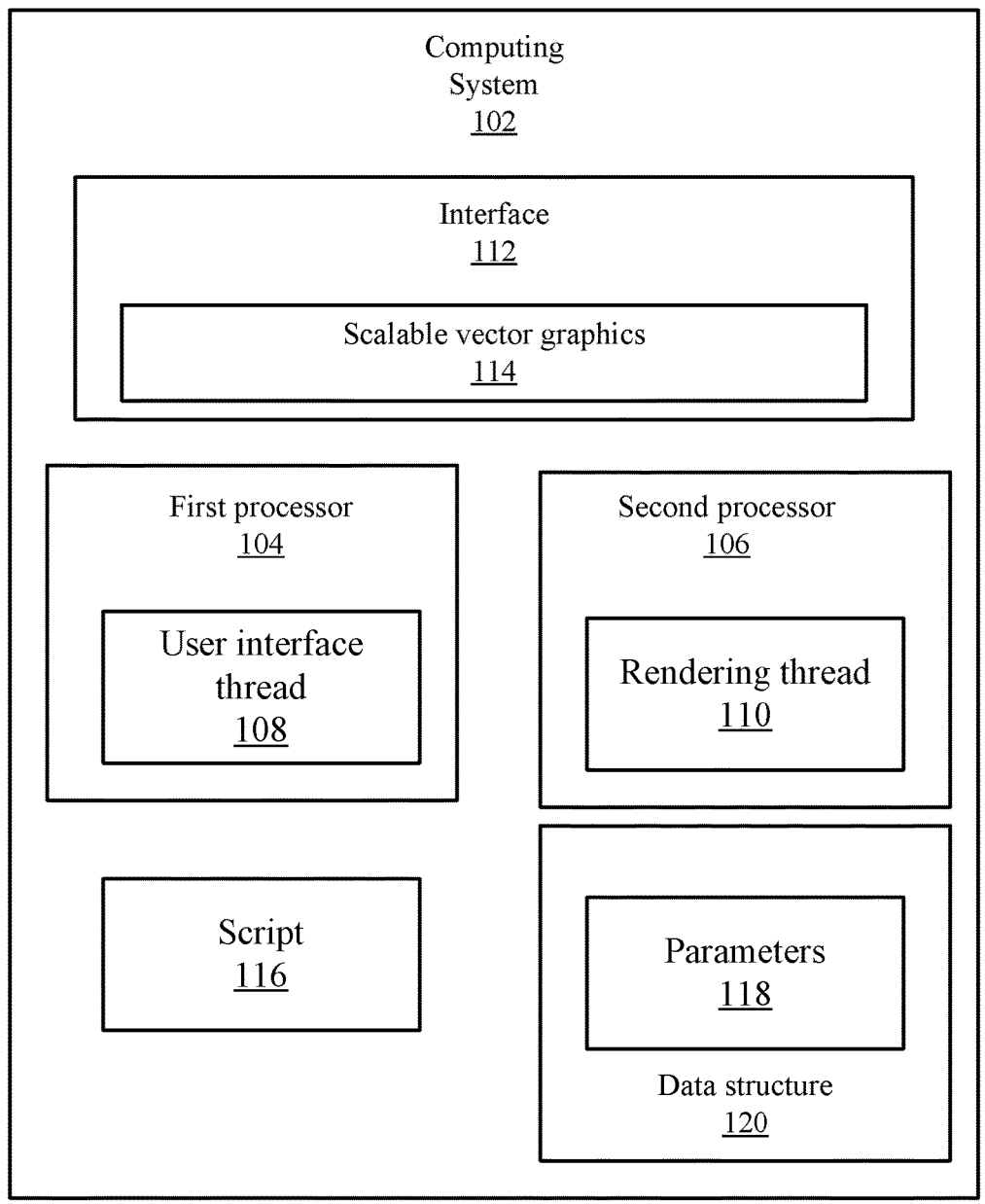
FIG. 1 depicts an example of a computing system according to some embodiments.

A computing device includes a user interface thread and a rendering thread. The user interface thread may interact with a script and receive events from the script regarding the display of scalable vector graphics (SVG) objects on a user interface. When events are received, the user interface thread may calculate parameters for the rendering of an SVG object, such as the positioning, color, layout, etc. The user interface thread then store the parameters in a data structure and send a request to the rendering thread to render the SVG object. The rendering thread retrieves the parameters from the data structure and then renders the SVG objects using the parameters. In contrast to a raster image, the rendering thread renders the SVG objects using the parameters. For the raster image, the rendering thread renders the pixels of the raster image.

While the rendering thread is rendering the SVG objects, the user interface thread can operate independently without being blocked allowing it to perform computations. Synchronization between the user interface and the rendering thread may be required at some point. For example, the synchronization may occur after the rendering thread rendered an SVG object and an additional step needs to be performed upon the rendering. Some SVG operations require multiple steps when rendering an object, such as in rendering operations, structural operations, clipping operations, and composition operations. For example, the SVG operation may require multiple steps to be performed where a result of a rendering of the SVG object is used to perform additional rendering of the SVG object (or other objects). In this example, the rendering thread may notify the user interface thread that the rendering is completed, and then the user interface thread can calculate additional parameters for the next step of the SVG operation. Once the parameters are calculated, the user interface thread stores the parameters in the data structure and sends another rendering request to the rendering thread. The rendering thread can then perform the next step of the SVG operation with the new parameters from the data structure. While the rendering thread is rendering the SVG object, the user interface thread may process events for the next step of the SVG operation or process events that are unrelated to the rendering of the SVG object.

Also, the rendering thread may process an event that changes some parameters that the rendering thread is using in the data structure. To synchronize with the rendering thread, the user interface notifies the rendering thread that the parameters have changed. The rendering thread can then synchronize and retrieve the new parameters. For example, the user interface thread may receive events from the script and re-calculate the parameters for the SVG definition of the SVG object. When the parameters that the rendering thread should be using to render the SVG object change, the user interface thread may store the new parameters in the data structure and send another rendering request to the rendering thread indicating that the parameters have changed. At this point, the rendering thread may synchronize and retrieve the new parameters from the data structure.

Relying on the parameters in the data structure and performing synchronizations allow for thread-independent SVG operations. The user interface thread may continue to perform computations while the rendering thread is rendering the SVG objects. This efficiently uses the user interface thread by not blocking the user interface thread while the rendering thread is performing the rendering of the SVG objects. An improvement in processing time is achieved by operating the threads independently. When synchronization is necessary, the user interface thread sends the request to the rendering thread. This keeps the states of the user interface thread and the rendering thread in synch.

System

FIG. 1 depicts an example of a computing system 102 according to some embodiments. Computing system 102 includes a user interface 112 that displays content. For example, user interface 112 may include a browser, such as a web browser, that is displaying a page, such as a webpage. Different types of content may be output, such as audio, video, text, audio, etc. In some embodiments, the content may include scalable vector graphics (SVG) 114. For example, interface 112 may render a page that includes one or more SVG objects. Although SVG objects are described, it will be understood that other content may be appreciated. For example, a page may include raster images and SVG objects.

Computing system 102 also includes a first processor 104 that is executing a user interface thread 108 and a second processor 106 that is executing a rendering thread 110. A thread may be a sequence of instructions that are executed by a computer processor. Although first processor 104 and second processor 106 are described, it will be understood that user interface thread 108 and rendering thread 110 may be running on the same processor. However, in some embodiments, first processor 104 may be a computer processing unit (CPU) and second processor 106 may be a graphical processing unit (GPU). User interface thread 108 and rendering thread 110 operate independently and can communicate with one another.

Scalable vector graphics 114 may include one or more objects in which rendering thread 110 renders using parameters 118 in an SVG definition in data structure 120. For example, each SVG object may include a definition of the object in addition to parameters 118. The definition may define the object to be rendered, such as a rectangle (rect). Parameters 118 may define characteristics of the object, such as the size, color, layout, and position.

SVG operations may be performed when rendering the SVG objects, such as rendering operations, structural operations, clipping operations, and composition operations. The SVG operations may require the rendering to be performed in multiple steps that are performed in sequence. For example, rendering operations may include filtering effects or other operations that are performed after the rendering of an image. For example, rendering may take the source image and perform some operation after the display, such as a filter. The composition operation may compose an object with different capabilities that are rendered in a special order. The result of a previous composition is needed to render the next composition. For example, composition may describe how shapes of objects are combined into a single image. The clipping operations may display an image and then clip some portion of the image after the display of the image. The structural operations may change the structure of the document object model that defines the structure of the objects. The structural operations may request structural information from rendering thread 110, such as information from the object model. The above operations may require synchronization between user interface thread 108 and rendering thread 110.

User interface thread 108 may operate independently until receiving information from rendering thread 110 indicating that a first step of the SVG operation has completed. For example, when rendering thread 110 performs a step of the SVG operation, rendering thread 110 may inform user interface thread 108 that the step has been completed. Then, user interface thread 108 may re-calculate parameters 118 for the second step of the SVG operation and store those parameters in data structure 120. Also, user interface thread 108 may have been already re-calculating parameters for the second step while rendering thread 110 was performing the first step. User interface thread 108 may finish calculating the parameters for the second step upon receiving an indication the first step is completed. User interface thread 108 may then notify rendering thread 110 that rendering thread 110 can continue with the second step of the SVG operation using the new parameters.

The use of data structure 120 allows user interface thread 108 to continue processing events, such as events from script 116 or any other event while rendering thread 110 is processing the SVG operation. The event may be any type of information that requires performing some computation. This increases the efficiency of user interface thread 108 by unblocking the user interface thread 108 while rendering thread 110 is performing the SVG operation. This is also more efficient than using a single thread as user interface thread 108 would have been blocked from processing any other event while performing the rendering.

In other examples, user interface thread 108 computes the parameters needed for rendering and stores the parameters 118 in data structure 120. Rendering thread 110 can then use the values for parameters 118 in data structure 120 as the current state until notified by user interface thread 108 of a change. User interface thread 110 may process events from a script 116 that cause parameters 118 to change. For example, script 116 may process an event, such as a timer, or input from objects being rendered, and cause changes to parameters 118 for the SVG objects. When the changes occur, user interface thread 108 may calculate new parameters 118 for the event. When the parameters change, user interface thread 108 may store the changed parameters 118 in data structure 120 and then notify rendering thread 110 of the changes. Rendering thread 110 can then synchronize and retrieve parameters 118.

Data structure 120 is used by rendering thread 110 as the correct state until user interface thread 108 indicates to rendering thread 110 that parameters 118 have changed. Rendering thread 110 can then render the SVG objects using the new parameters. The use of data structure 120 and the synchronization allows user interface thread 108 and rendering thread 110 to operate independently and more efficiently by not blocking user interface thread 108. The changes in parameters may occur when a multiple step SVG operation is being performed or when any other rendering operation is being performed.

In addition to allowing user interface thread 108 to process other events while rendering thread 110 renders the SVG objects, the rendering of the objects may be smoother. For example, the rendering may become choppy if small changes are rendered in succession. In contrast, user interface thread 108 may completely calculate the change that occurs while rendering thread 110 continues to render the SVG objects using parameters 118. When it is time to change parameters 118, user interface thread 108 changes parameters 118 and notifies rendering thread 110.

Time Line for Sequential SVG Operations

Figure 2:
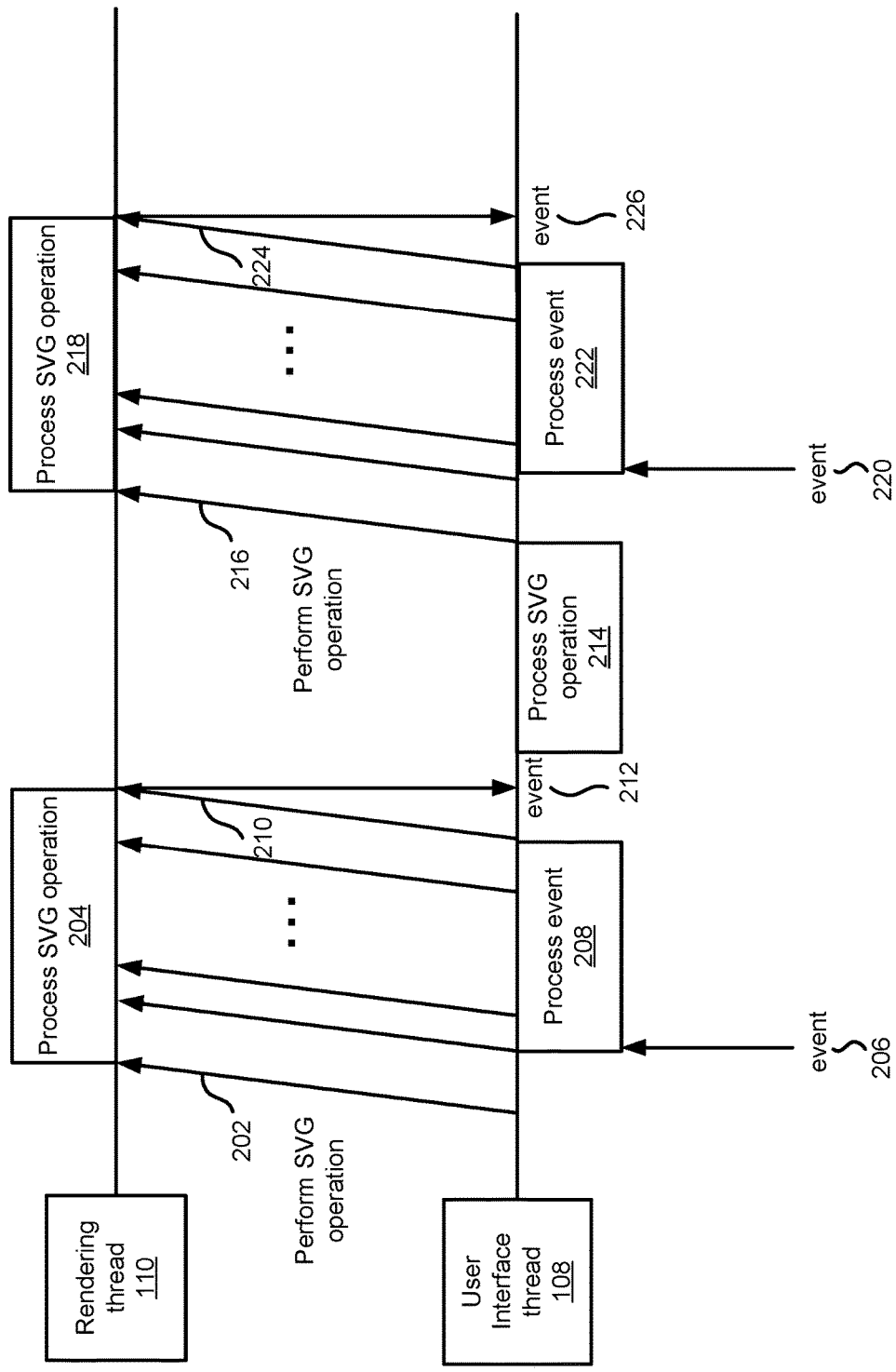
FIG. 2 depicts a timeline for a user interface thread and a rendering thread according to some embodiments.

FIG. 2 depicts a timeline for user interface thread 108 and rendering thread 110 according to some embodiments. User interface thread 108 and rendering thread 110 operate independently as discussed above. At 202, user interface thread 108 may send a signal to rendering thread 110 to perform an SVG operation using an SVG definition. For example, the SVG definition may be define one or more SVG objects and parameters 118 in data structure 120. Rendering thread 110 uses the values of parameters 118 in data structure 120 as the current state to process the SVG operation at 204 until further notified.

In some examples, the SVG operation may include a sequence of steps in which an object may need to be rendered and then another step occurs, such as when an object is rendered, and then a portion of the object is clipped. User interface thread 108 may continue to send messages to rendering thread 110 to determine whether or not the step of the SVG operation has been completed. Also, in the meantime, at 206, user interface thread 108 may receive an event to process. For example, user interface thread 108 may process an event for script 116 at 208. The event may be related to the rendering of the SVG operation, such as for a second step, or may not be related. For example, user interface thread 108 may be processing events for operations other than the one being processed by rendering thread 110. However, user interface 108 is not blocked from processing the event at 208 while rendering thread 110 is processing the SVG operation at 204.

At 210, user interface thread 108 sends a request to rendering thread 110 for the status of the SVG operation. At 212, rendering thread 110 sends a signal to user interface thread 108 that the SVG operation has been processed to a point at which another step may be performed. At 214, user interface thread 108 may then process the SVG operation to determine parameters 118 for the next step in the SVG operation. Once the parameters are calculated, user interface thread 108 stores the new values for parameters 118 in data structure 120.

At 216, user interface thread 108 sends a signal to rendering thread 110 to perform the next step of the SVG operation with the new values for parameters 118. At 218, rendering thread 110 continues to process the SVG operation. As described before, user interface thread 108 may continue to send requests to rendering thread 110 to determine if the step of the SVG operation is finished. Additionally, at 220, user interface thread 108 may receive an event, such as from script 116, and process the event at 222. At 224, user interface thread 108 sends a request to rendering thread 110 to determine if a step of the SVG operation has completed, and at 226, user interface thread 108 receives a signal from rendering thread 110 noting that the SVG operation has finished. This process may continue until the steps of the SVG operation are all performed.

Figure 3:
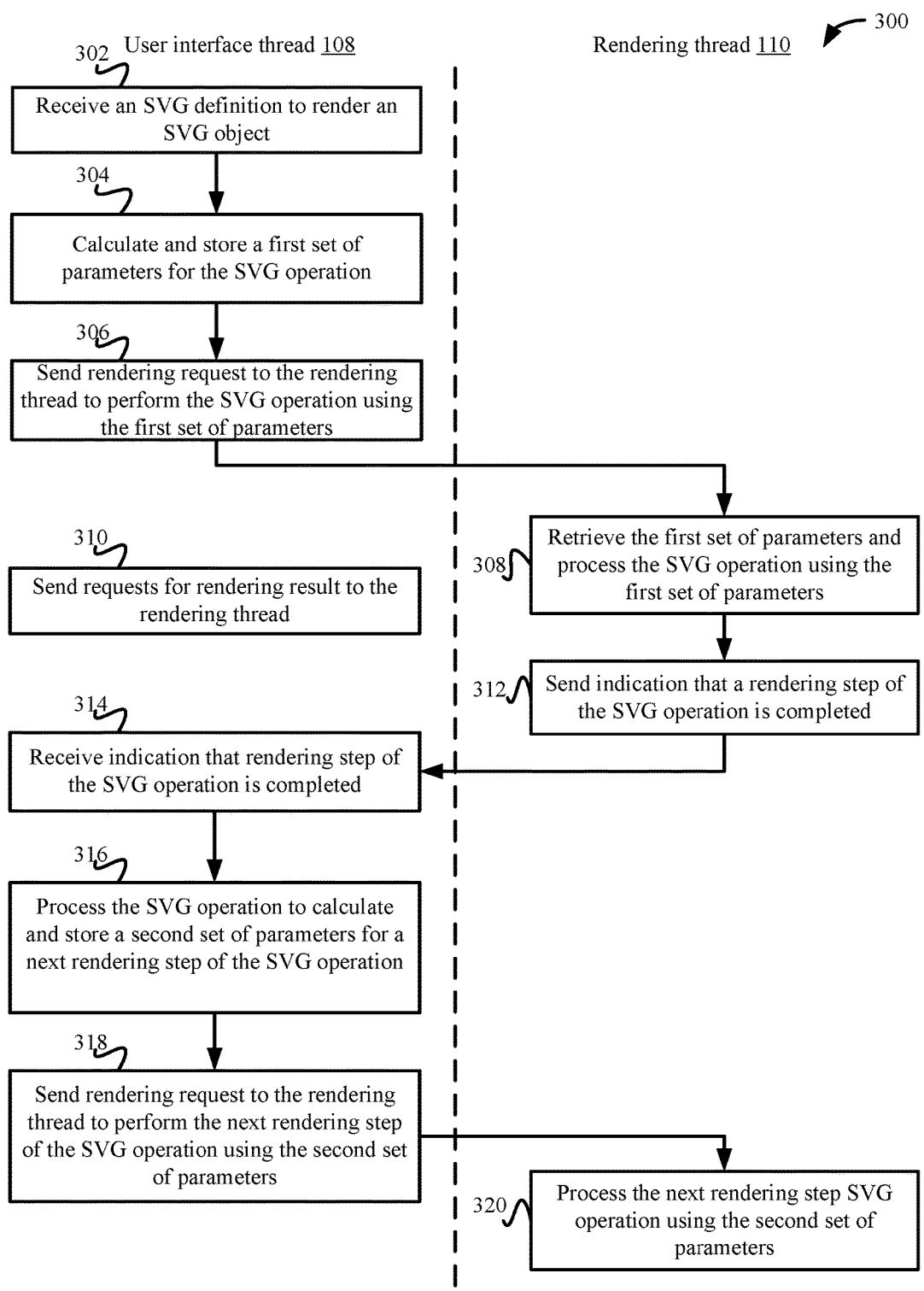
FIG. 3 depicts a simplified flowchart of a method for performing sequential steps in an SVG operation according to some embodiments.

FIG. 3 depicts a simplified flowchart 300 of a method for performing sequential steps in an SVG operation according to some embodiments. At 302, user interface thread 108 receives an SVG definition to render an SVG object. For example, one of the SVG rendering operations, SVG structural operations, SVG clipping operations, and/or SVG composition operations may be received. These operations may require multiple rendering steps to be performed in sequence that depend on one another.

At 304, user interface thread 108 calculates and stores a first set of parameters for the SVG operation. Then, at 306, user interface thread 108 sends a rendering request to rendering thread 110 to perform the SVG operation using the first set of parameters.

At 308, rendering thread 110 may perform a synchronization to retrieve the first set of parameters and process the SVG operation using the first set of parameters. Meanwhile, at 310, user interface thread 108 sends requests for a rendering result to rendering thread 110 for the SVG operation. Also, user interface thread 108 may be processing events while rendering thread 110 is rendering the SVG object. At 312, when rendering thread 110 has completed the rendering step of the SVG operation, rendering thread 110 sends an indication that a rendering step of the SVG operation is completed.

At 314, user interface thread 108 receives the indication that the rendering step of the SVG operation is completed. At 316, user interface thread 108 processes the SVG operation to calculate and store a second set of parameters for a next rendering step of the SVG operation. The second set of parameters may be different from the first set of parameters. At 318, user interface thread 108 sends a rendering request to rendering thread 110 to perform the next rendering step of the SVG operation using the second set of parameters, such as clipping part of a rendered image or filtering an image. At 320, rendering thread 110 then processes the next rendering step of the SVG operation using the second set of parameters. The above process may continue for each step of the SVG operation until all steps have been performed.

SVG Parameter Synchronization

Figure 4:
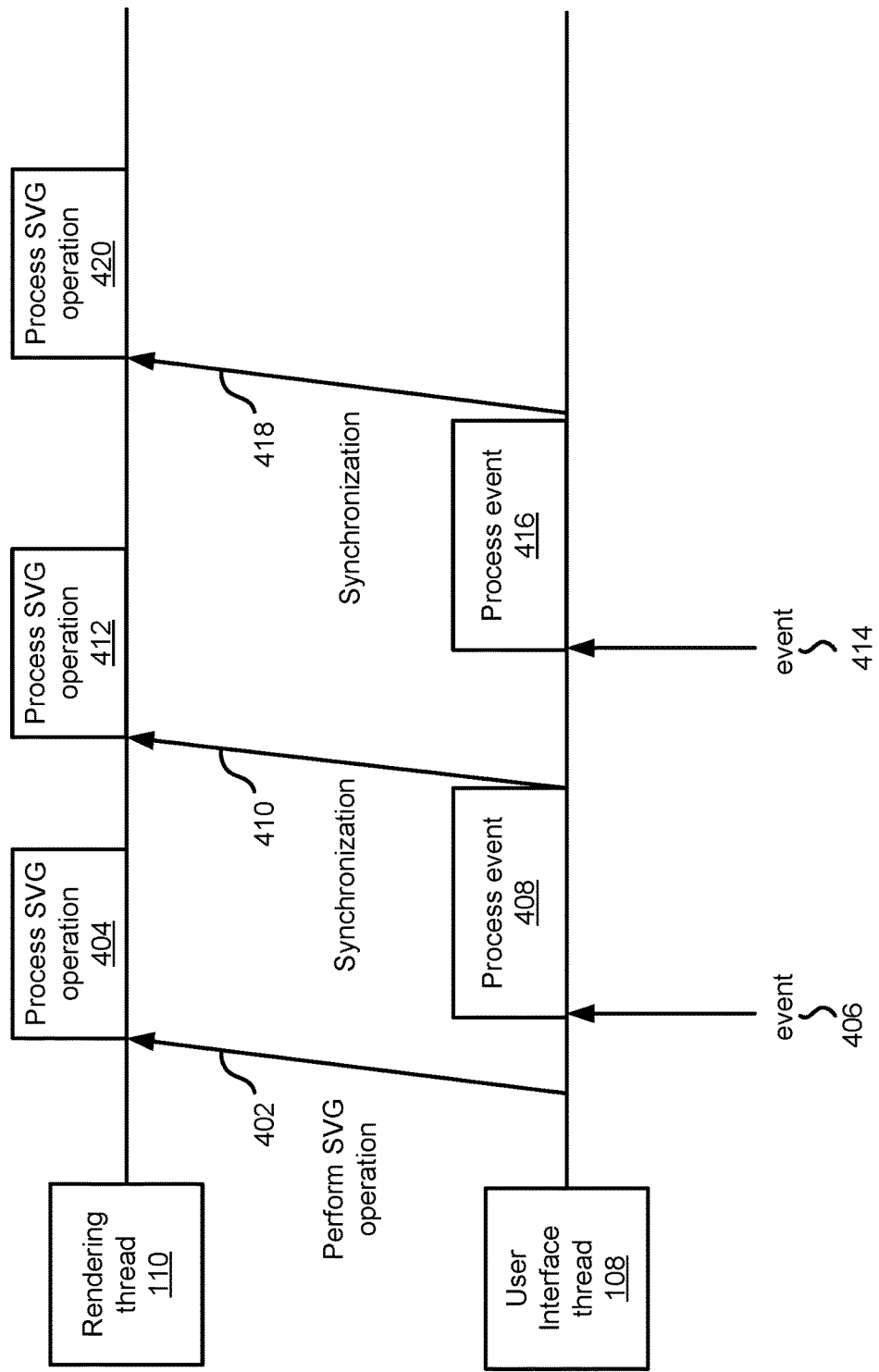
FIG. 4 depicts an example of a timeline for the user interface thread and the rendering thread to synchronize according to some embodiments.

FIG. 4 depicts an example of a timeline for user interface thread 108 and rendering thread 110 to synchronize according to some embodiments. Because rendering thread 110 is using parameters 118 in data structure 120 and user interface thread 108 is operating independently, there may be times when the values of parameters 118 change in data structure 120. The change may occur when processing the rendering steps of the SVG operation as described above or when processing other SVG operations. Rendering thread 110 assumes that the current state of the values of parameters 118 do not change and continues the rendering of the SVG objects until being notified by user interface thread 108.

At 402, user interface thread 108 may send a signal to rendering thread 110 to perform an SVG operation. The SVG operation may be to render an SVG object. At 404, rendering thread 110 processes the SVG operation and may render the SVG object. At this point, rendering thread 110 assumes the values of parameters 118 are the current state until further notice. Rendering thread 110 may not continually query user interface thread 108 to determine if the parameters change because that may introduce additional traffic between rendering thread 110 and user interface thread 108.

At 406, user interface thread 108 may receive an event, such as from script 116, and process the event for script 116. The event may be related to the SVG operation being performed or may not affect the rendering of the SVG object. At 408, while rendering thread 110 is processing the SVG operation at 204, user interface thread 108 processes the event. For example, processing the event may be determining whether or not to change the color of the SVG object based on a timer. User interface thread 108 may receive a current time as the event and then determine whether or not to change the color. At some point, user interface thread 108 may change the color and user interface thread 108 changes the values for parameters 118 in data structure 120 to reflect the change. Then, at 410, user interface thread 108 sends a signal to rendering thread 110 to synchronize. At this point, rendering thread 110 may retrieve the values for parameters 118 in data structure 120 and use these parameters to process the SVG operation at 412. In some examples, rendering thread 110 may change the color of the SVG object.

Similar to before, while rendering thread 110 is processing the SVG operation at 412, user interface thread 108 may receive an event at 414 and process the event at 416. Similar to above, user interface thread 108 may receive a time and determine whether to change the color of the object based on the value of the timer. In some examples, script 116 may specify that the color of the object be changed every second. If user interface thread 108 was blocked as discussed in the Background, user interface thread 108 may miss some changes of the color because user interface thread 108 was blocked for multiple seconds. For example, at the 2 second mark, user interface thread 108 changes the color to red. Then, at the 3 second mark user interface thread 108 is blocked so user interface thread 108 cannot process the change to another color. When user interface thread 108 becomes unblocked at the 5 second mark, user interface thread 108 has missed multiple color changes, which may result in choppy display of the object. For example, user interface thread 108 may skip the color changes or process them all at once.

At 418, when values for parameters 118 change, user interface thread 108 sends a signal to rendering thread 110 to synchronize. Rendering thread 110 may then retrieve the values for parameters 118 and continue processing the SVG operation at 420.

Accordingly, using the above process, user interface thread 108 and rendering thread 110 may operate independently and only synchronize when needed, such as when the values for parameters 118 change. Rendering thread 110 may process one or more SVG operations and only synchronize to determine new parameters when needed.

Figure 5:
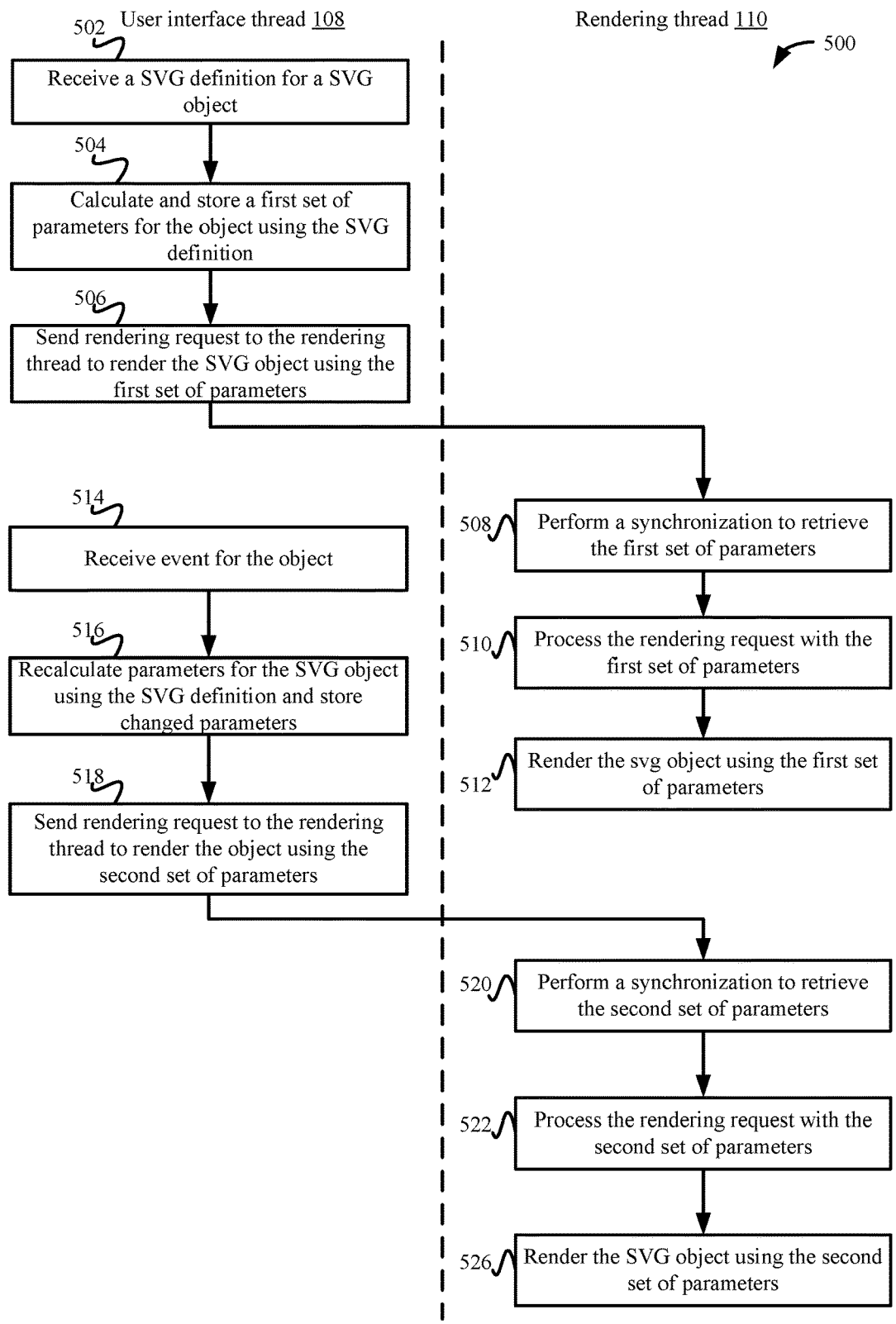
FIG. 5 depicts a simplified flowchart of a method for synchronizing while processing SVG operations according to some embodiments.

FIG. 5 depicts a simplified flowchart 500 of a method for synchronizing while processing SVG operations according to some embodiments. The flowchart shows operations by user interface thread 108 and rendering thread 110. At 502, user interface thread 108 receives a SVG definition for an object. For example, the SVG definition may define the SVG object. In some examples, the SVG object may be a rectangle that is defined with dimensions, positioning, and color.

At 504, user interface thread 108 may calculate a first set of parameters for the object using the SVG definition. For example, the values for the first set of parameters may define how rendering thread 110 renders the SVG object. At 506, user interface thread 108 sends a rendering request to rendering thread 110 to render the SVG object using the first set of parameters.

At 508, rendering thread 110 performs a synchronization to retrieve the first set of parameters 118 from data structure 120. At 510, rendering thread 110 then processes the rendering request with the first set of parameters. At 512, rendering thread 110 renders the SVG object using the first set of parameters.

At 514, user interface thread 108 may receive an event for the object. Then, at 516, user interface thread 108 may re-calculate the parameters for the SVG object using the SVG definition. If the parameters change, at 518, user interface thread 108 stores the changed parameters in data structure 120. At 520, user interface thread 108 sends a rendering request to rendering thread 110 to render the object using the second set of parameters. Similar to above, at 522, rendering thread 110 performs a synchronization to retrieve the second set of parameters. At 524, rendering thread 110 then processes the rendering request with the second set of parameters. At 526, rendering thread 110 renders the SVG object using the second set of parameters.

Computing System 102

Figure 6:
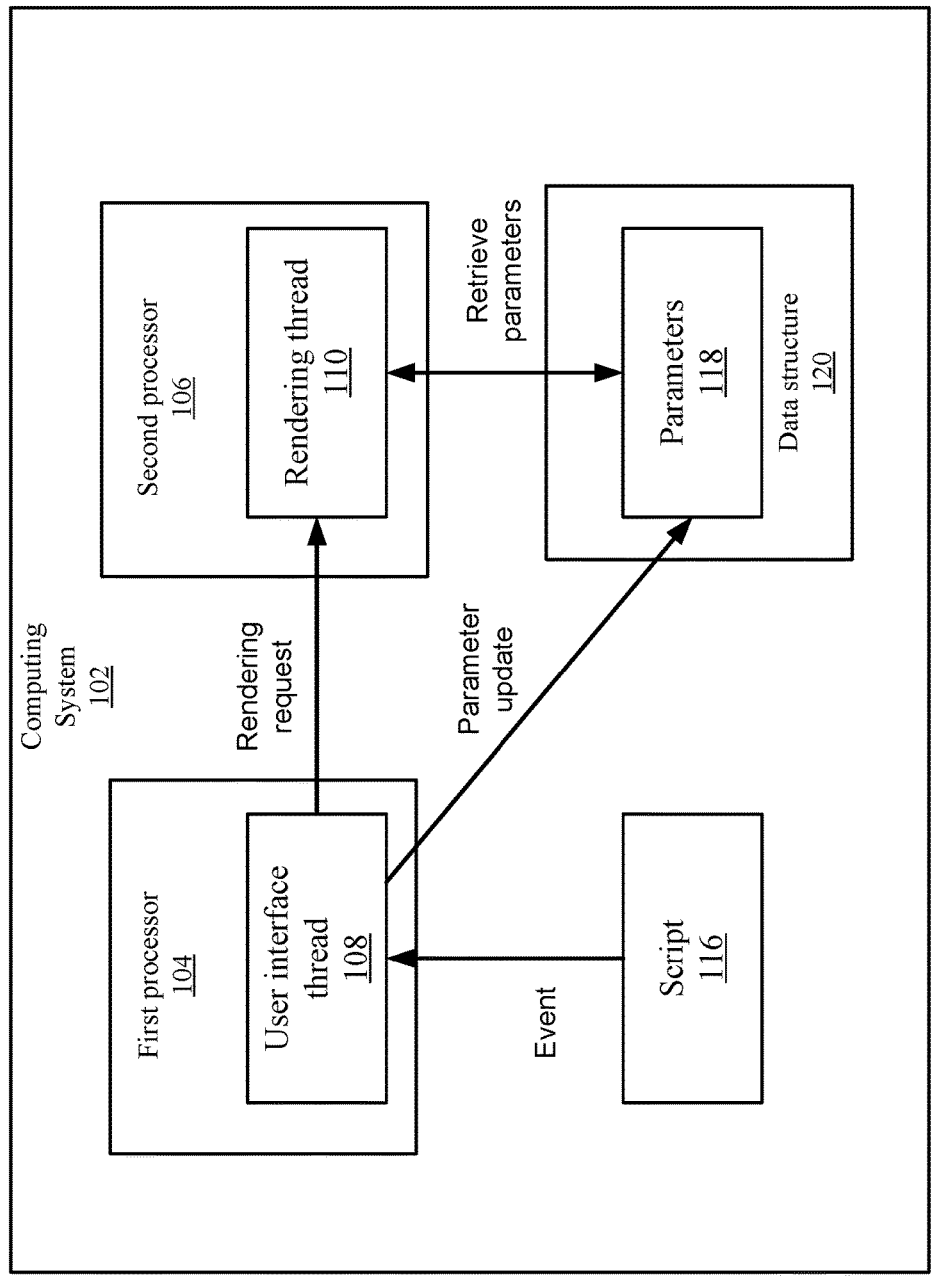
FIG. 6 shows a data flow for the computing system according to some embodiments.

FIG. 6 shows a data flow for computing system 102 according to some embodiments. User interface thread 108 may process an event for a script 116. When a parameter update occurs, user interface thread 108 may update the values of parameters 118 in data structure 120. Then, user interface thread 108 may send a rendering request to rendering thread 110 at which time, rendering thread 110 may retrieve the values of parameters 118 from data structure 120.

Rendering thread 110 may assume that the current state of parameters 118 is valid until receiving notification from user interface thread 108. This allows rendering thread 110 to operate independently from user interface thread 108. User interface thread 108 can then process other events while rendering thread 110 is rendering the SVG objects.

CONCLUSION

Accordingly, thread independent SVG operations can be performed. This improves the performance of computing system 102 by not blocking user interface thread 108 while rendering thread 110 is rendering an object. Synchronization is used to synchronize user interface thread 108 and rendering thread 110 at the appropriate times. The thread independence allows SVG operations to be performed faster and also renders objects more efficiently and smoothly.

Example Computer System

Figure 7:
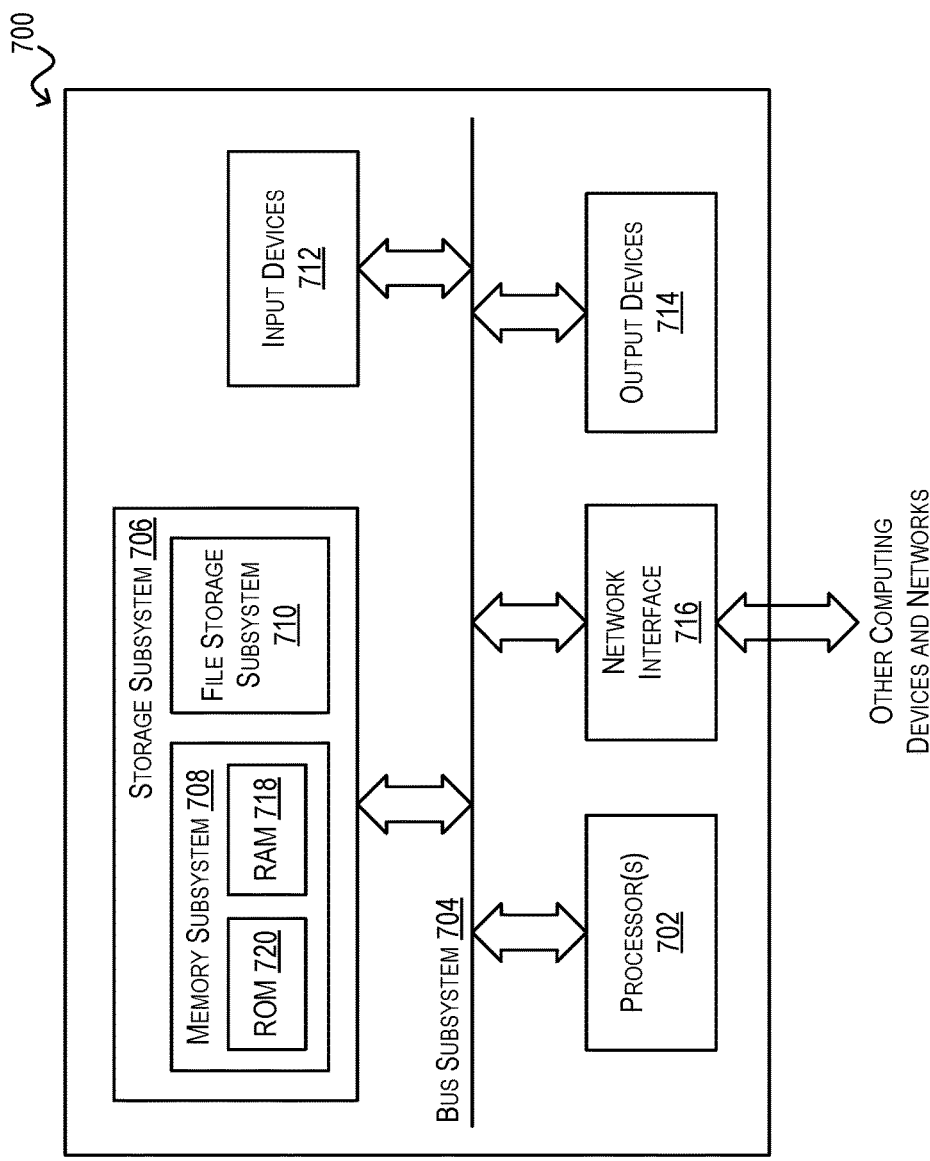
FIG. 7 depicts a simplified block diagram of an example computer system according to certain embodiments.

FIG. 7 depicts a simplified block diagram of an example computer system 700 according to certain embodiments. Computer system 700 can be used to implement any of the computing devices, systems, or servers described in the foregoing disclosure. As shown in FIG. 7, computer system 700 includes one or more processors 702 that communicate with a number of peripheral devices via a bus subsystem 704. These peripheral devices include a storage subsystem 706 (comprising a memory subsystem 708 and a file storage subsystem 710), user interface input devices 712, user interface output devices 714, and a network interface subsystem 716.

Bus subsystem 704 can provide a mechanism for letting the various components and subsystems of computer system 700 communicate with each other as intended. Although bus subsystem 704 is shown schematically as a single bus, alternative embodiments of the bus subsystem can utilize multiple busses.

Network interface subsystem 716 can serve as an interface for communicating data between computer system 700 and other computer systems or networks. Embodiments of network interface subsystem 716 can include, e.g., an Ethernet card, a Wi-Fi and/or cellular adapter, a modem (telephone, satellite, cable, ISDN, etc.), digital subscriber line (DSL) units, and/or the like.

User interface input devices 712 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 700.

User interface output devices 714 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 700.

Storage subsystem 706 includes a memory subsystem 708 and a file/disk storage subsystem 710. Subsystems 708 and 710 represent non-transitory computer-readable storage media that can store program code and/or data that provide the functionality of embodiments of the present disclosure.

Memory subsystem 708 includes a number of memories including a main random access memory (RAM) 718 for storage of instructions and data during program execution and a read-only memory (ROM) 720 in which fixed instructions are stored. File storage subsystem 710 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 700 is illustrative and many other configurations having more or fewer components than system 700 are possible.

The above description illustrates various embodiments of the present disclosure along with examples of how aspects of these embodiments may be implemented. The above examples and embodiments should not be deemed to be the only embodiments, and are presented to illustrate the flexibility and advantages of the present disclosure as defined by the following claims. For example, although certain embodiments have been described with respect to particular process flows and steps, it should be apparent to those skilled in the art that the scope of the present disclosure is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the present disclosure as set forth in the following claims.

What is claimed is:

1. A computer system comprising:
a processor; and
a computer readable storage medium having stored thereon program code that, when executed by the processor, causes the processor to:
send, at a user interface thread, a rendering request for a scalable vector graphics operation using a scalable vector graphics object to a rendering thread, the rendering thread processing the scalable vector graphics operation to render the scalable vector graphics object using a first set of parameters that is stored in a data structure;
perform, by the user interface thread, a computation that calculates a second set of parameters for the scalable vector graphics operation based on an event;
store, by the user interface thread, the second set of parameters in the data structure; and
send, by the user interface thread, a signal to the rendering thread indicating that the first set of parameters have changed to the second set of parameters to allow the rendering thread to synchronize and use the second set of parameters to process the scalable vector graphics operation.

2. The computer system of claim 1, wherein the user interface thread and the rendering thread operate independently.

3. The computer system of claim 2, wherein the user interface thread performs the computation while the rendering thread is processing the scalable vector graphics operation.

4. The computer system of claim 3, wherein the computation is related to the scalable vector graphics operation.

5. The computer system of claim 3, wherein the computation is for a different operation from the scalable vector graphics operation.

6. The computer system of claim 1, wherein perform the computation comprises:
calculate, by the user interface thread, the second set of parameters while the rendering thread is processing the scalable vector graphics operation.

7. The computer system of claim 6, wherein send the signal to the rendering thread notifies the rendering thread to retrieve the second set of parameters from the data structure.

8. The computer system of claim 6, while the rendering thread is processing the scalable vector graphics operation, the first user interface thread is processing other computations unrelated to the scalable vector graphics operation.

9. The computer system of claim 6, while the rendering thread is processing the scalable vector graphics operation, the first user interface thread is processing computations related to the scalable vector graphics operation.

10. The computer system of claim 1, wherein perform the computation comprises:
calculate, by the user interface thread, the second set of parameters upon the rendering thread finishing processing a first step of the scalable vector graphics operation; and
store the second set of parameters in the data structure for a second step of the scalable vector graphics operation.

11. The computer system of claim 10, wherein send the signal notifies the second rendering thread that the second step of the scalable vector graphics operation can be processed using the second set of parameters.

12. The computer system of claim 10, wherein while the rendering thread is processing the first step of the scalable vector graphics operation, the user interface thread is processing other computations unrelated to the scalable vector graphics operation.

13. The computer system of claim 10, wherein while the rendering thread is processing the first step of the scalable vector graphics operation, the user interface thread is processing computations for the second step of the scalable vector graphics operation.

14. The computer system of claim 1, wherein:
the user interface thread executes on a first processor, and
the rendering thread executes on a second processor.

15. A method comprising:
send, at a user interface thread of a computing device, a rendering request for a scalable vector graphics operation using a scalable vector graphics object to a rendering thread, the rendering thread processing the scalable vector graphics operation to render the scalable vector graphics object using a first set of parameters that is stored in a data structure;
perform, by the user interface thread of the computing device, a computation that calculates a second set of parameters for the scalable vector graphics operation based on an event;
store, by the user interface thread of the computing device, the second set of parameters in the data structure; and
send, by the user interface thread of the computing device, a signal to the rendering thread indicating that the first set of parameters have changed to the second set of parameters to allow the rendering thread to synchronize and use the second set of parameters to process the scalable vector graphics operation.

16. The method of claim 15, wherein the user interface thread and the rendering thread operate independently.

17. The method of claim 16, wherein the user interface thread performs the computation while the rendering thread is processing the scalable vector graphics operation.

18. The method of claim 15, wherein perform the computation comprises:
calculate, by the user interface thread, the second set of parameters while the rendering thread is processing the scalable vector graphics operation.

19. A non-transitory computer readable storage medium having stored thereon program code executable by a computer system, the program code causing the computer system to:
- send, at a user interface thread, a rendering request for a v operation using a scalable vector graphics object to a rendering thread, the rendering thread processing the scalable vector graphics operation to render the scalable vector graphics object using a first set of parameters that is stored in a data structure;
- perform, by the user interface thread, a computation that calculates a second set of parameters for the scalable vector graphics operation based on an event;
- store, by the user interface thread, the second set of parameters in the data structure; and
- send, by the user interface thread, a signal to the rendering thread indicating that the first set of parameters have changed to the second set of parameters to allow the rendering thread to synchronize and use the second set of parameters to process the scalable vector graphics operation.

* * * * *